Oct. 20, 1925.

K. A. FERKEL 1,558,153

TEMPERATURE INDICATING MEANS

Filed Jan. 4, 1924

INVENTOR.
Karl A. Ferkel
BY
ATTORNEY

Patented Oct. 20, 1925.

1,558,153

UNITED STATES PATENT OFFICE.

KARL A. FERKEL, OF LOS ANGELES, CALIFORNIA.

TEMPERATURE-INDICATING MEANS.

Application filed January 4, 1924. Serial No. 684,308.

*To all whom it may concern:*

Be it known that I, KARL A. FERKEL, a citizen of the United States, residing in the city of Los Angeles, county of Los Angeles, and State of California, have invented certain new and useful Improvements in Temperature-Indicating Means, of which the following is a specification.

My invention relates to temperature indicating means, and broadly stated, my invention contemplates the use of a substance which is normally opaque, but which, when heated to a certain temperature, becomes transparent, thus making visible a surface, mark, design, or element covered thereby. For example, a container for such a substance has a glass or transparent front, and a back having a red surface, or an element therein, visible through said front under normal conditions. When such a substance is placed therein, in its normal or opaque condition, said red surface, or element, is hidden, but when the container is subjected to heat, and the necessary temperature is reached, said substance is transformed or rendered transparent and the red becomes visible. This combination of elements can be used, where it is desired to keep the temperature below a certain degree, for indicating when the temperature reaches that degree. It might be used as a signal, or warning. In effect the substance operates as a curtain which, when rendered transparent, exposes the element placed therein or the back thereof, to view.

In order to describe my invention and to illustrate one embodiment thereof, I have shown it on the accompanying sheet of drawings embodied as a motor meter, or indicator for indicating when the temperature of the water in the radiator of an automobile is getting high, or has reached the converting stage necessary to render the contents transparent. In the drawings,—

Figure 2:
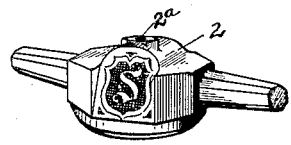
Figure 2 is a smaller view showing the front of said cap with design.
Figure 1:
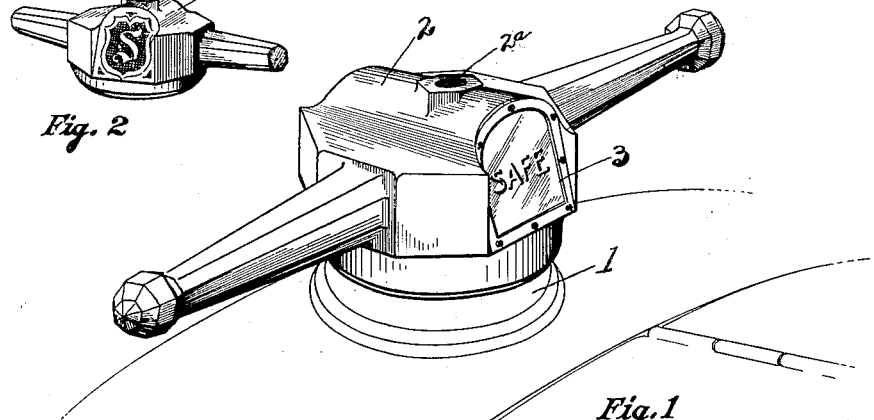
Figure 1 is a perspective view of a radiator cap embodying my invention.
Figure 3:
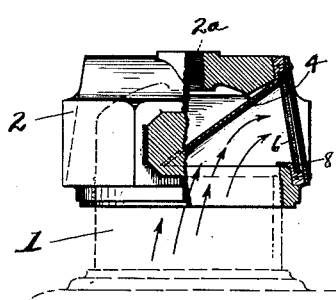
Figure 3 is a partial sectional view of this embodiment of my invention.
Figure 6:
Figure 6 shows a front glass with the word "Safe" in transparent letters and a back member of red color with the word "Danger" in letters to be made visible when the substance is rendered transparent.

Referring now in detail to the drawings, I will describe the embodiments of my invention shown for descriptive purposes. In the drawings, 1, designates a radiator head or neck, adapted to receive a radiator cap or cover, 2, which may be of any desired type or design. In the showing in Figs. 1 and 2, my invention is embodied therein, as at 3, while the front of said cap is provided with an ornamental design and letter, which may be the initial letter of the owner. This, however, is only to give symmetry to the cap and is only shown for illustrative purposes.

Figure 4:
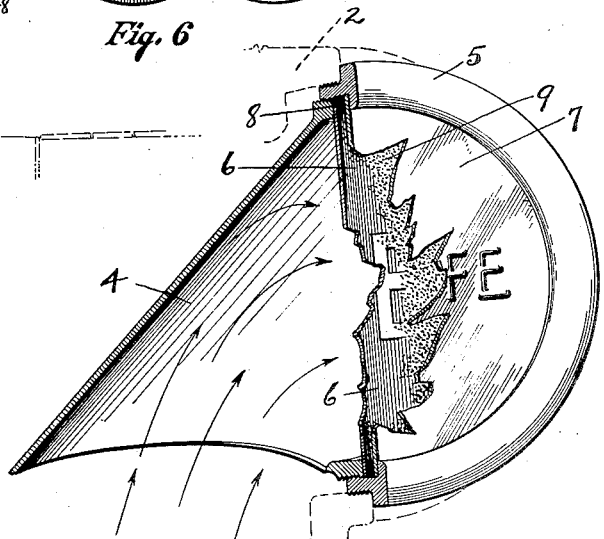
Figure 4 is a perspective view on a larger scale showing the invention apart from the cap with portions broken away to show the construction and arrangement.

My invention as here embodied includes a deflecting member, as 4, Fig. 4, with a border band or ring, 5, screwed thereto, with a back member, 6, and a front glass or transparent member 7, clamped therebetween, with a suitable gasket, 8, between the members 6 and 7, to form a container, or receiving space between said members 6 and 7, as shown. The back member is preferably of copper, or other suitable metal which will permit of certain expansion and contraction, and is shaded to indicate that it is red, with the word "Danger" in conspicuous letters thereon to be rendered visible in a manner hereinafter described. The front glass or transparent member 7 is also provided with letters formed therein, or otherwise placed thereon to be transparent and yet be readable under normal conditions, at a short distance. Between the members 6 and 7, in the container portion of the device, I place a substance, or matter, which I will hereinafter describe more in detail, which is normally opaque, but which becomes transparent as soon as heated to a certain temperature. This substance hides from view the red back of the member 6, and the letters thereon, but as soon as sufficiently heated it becomes transparent and renders visible the red back member 6, and the word "Danger", the word "Safe" being sufficiently transparent that it does not obstruct the more conspicuous color when the substance becomes transparent. This substance is designated 9. The heat from the radiator finds its way up into the cap, against the deflector member 4, and to the back metal member 6, thus communicating the heat directly to said metal member 6, and operating to heat the substance 9, between the members 6 and 7.

Figure 5:
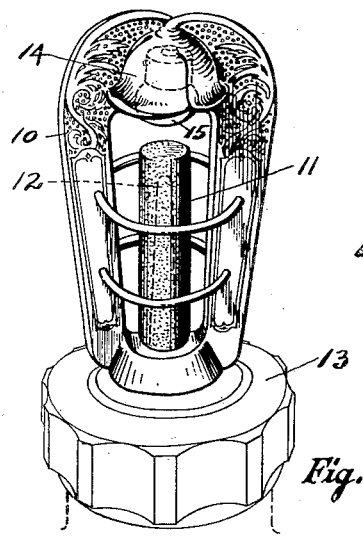
Figure 5 is a side elevation of a different form of the invention.

In Fig. 5, I have shown the invention embodied as an attachment for a radiator cap, with an ornamental body 10, with a glass or transparent container, 11, filled with the substance, as indicated by the dots, with an element within the container, indicated in light broken lines, as at 12, covered by said substance, and adapted to be rendered visible when said substance reaches its transparent condition. The radiator cap, 13, may be of any desired type or design, and the device might be mounted on the cap shown in Fig. 1, which is provided with a threaded socket, as 2$^a$. In the top of the body member, as a part of the ornamentation, is shown the design of a poppy, 14, forming a shade for a small electric lamp, 15, for illuminating the indicator container, 11, at night. It will be understood, of course, that many designs of device can be made and used for embodying my invention, and also that the invention can be embodied in many other places, but that its function is the same, namely, the changing of the substance from opaque condition to transparency to make visible something covered thereby.

I will now describe one substance or composition of matter which will function in the manner referred to.

Benzil, an organic compound having the chemical formula $C_6H_5COCOC_6H_5$.

The melting point of this substance or compound is 95° C.

It has a boiling point of 346° C. This, of course, is higher than any temperature which would be developed in a motor.

This salt, or compound, in its normal or solid state is opaque, but becomes transparent when it reaches a temperature of 95° C., or when it is liquefied.

In order to get practical results in the use of such a salt or compound, it must be absolutely chemically pure.

I claim:

1. Temperature indicating means including a container, an element therein, a substance placed in said container and normally opaque, said substance being adapted to be rendered transparent under heat, whereby to expose to view said element in said container.

2. In a device of the character referred to, in combination, a container having a transparent window, an element therein visible through said window, and a substance which is normally opaque placed in said container to cover said element, said substance having the property of becoming transparent under heat, whereby to expose said element to view.

3. Means for indicating rise in temperature comprising a container having a metal wall and a transparent wall, said metal wall being normally visible through said transparent wall when said container is empty, and an opaque substance filled into the space between said metal wall and said transparent wall, to cover said metal wall, said substance being such that heat will transform it into a transparent condition whereby to expose to view, through said transparent wall, said metal wall.

4. A motor meter of the character referred to comprising a body, means forming a container in said body, said container having a metal wall and a transparent wall, said metal wall being subject to heat influence, indicating means on said metal wall visible through said transparent wall, and a substance between said walls which is normally opaque, said substance having the property of being rendered transparent under the influence of heat, whereby to expose to view through said transparent wall and said substance the indicating means on said metal wall.

5. A motor meter for connection to a radiator having a container member constituting a signal, a substance covering said member, said substance being normally opaque and obscuring said member, said substance being adapted to be rendered transparent by heat and to become opaque when cool, whereby to obscure and expose said signal.

6. Temperature indicating means including a container, an element therein, and a substance covering said element, said substance having the property of being opaque at one temperature and transparent under another temperature, whereby to hide or to expose said element.

Signed at Los Angeles, Los Angeles County, California, this 21st day of December, 1923.

KARL A. FERKEL.